(12) United States Patent
Meredith et al.

(10) Patent No.: US 8,556,036 B1
(45) Date of Patent: Oct. 15, 2013

(54) ADJUSTABLE TREE STAND DEVICE

(71) Applicants: Gregory Meredith, Howell, MI (US); Robert Borgstrom, Brighton, MI (US)

(72) Inventors: Gregory Meredith, Howell, MI (US); Robert Borgstrom, Brighton, MI (US)

(*) Notice: Subject to any disclaimer, the term of this patent is extended or adjusted under 35 U.S.C. 154(b) by 0 days.

(21) Appl. No.: 13/674,931

(22) Filed: Nov. 12, 2012

(51) Int. Cl.
*A01M 31/00* (2006.01)

(52) U.S. Cl.
USPC ............................ 182/188; 182/113; 182/187

(58) Field of Classification Search
USPC .......................................... 182/187, 188, 113
See application file for complete search history.

(56) References Cited

U.S. PATENT DOCUMENTS

| | | | |
|---|---|---|---|
| 5,316,104 A * | 5/1994 | Amacker ...................... | 182/187 |
| 5,492,198 A * | 2/1996 | Williams ...................... | 182/136 |
| 6,520,291 B2 * | 2/2003 | Andrey ........................ | 182/116 |
| 7,334,837 B1 * | 2/2008 | Long ............................ | 297/16.2 |
| 8,230,972 B2 * | 7/2012 | Johnson ........................ | 182/187 |
| 2003/0042076 A1 * | 3/2003 | Ulrich .......................... | 182/136 |
| 2007/0039779 A1 * | 2/2007 | Ellingson ..................... | 182/115 |
| 2009/0229916 A1 * | 9/2009 | Berkbuegler ................ | 182/113 |

* cited by examiner

*Primary Examiner* — Alvin Chin Shue
(74) *Attorney, Agent, or Firm* — Inventa Capital PLC

(57) ABSTRACT

An adjustable tree stand assembly of the present invention is used by hunters and naturalists. The assembly presents a support frame of a generally rectangular configuration having a first support member to be connected to a tree and an arm extending in cantilevered fashion to a housing adaptable to receive a seat and seat frame assembly. The seat and seat frame assembly includes a seat portion, a back support portion and a leg or pin extending from the seat portion to be engaged in the housing. An adjustable shooting rail is connected to and extends from the seat and seat frame assembly. The housing is further connected to a platform for supporting the hunter.

17 Claims, 13 Drawing Sheets

ADJUSTABLE TREE STAND DEVICE

FIELD OF THE INVENTION

The present invention relates to a tree stand and more particularly to a tree stand which may be mounted on trees and other surfaces.

BACKGROUND OF THE INVENTION

Since the beginning of history, man has hunted animals for food to live and to utilize other parts for clothing and other essential reasons. Today, men still hunt animals for food and sport. The overall sport of hunting has increased in popularity because of the challenge and enjoyment of outdoor life and has become a major industry in the United States. Some hunters or naturalists will just walk through the forest; however, this limits the wildlife they will see due to either noise or visualization due to vegetation. Many hunters or naturalist would opt for a tree stand when the forest or vegetation canopy is high; thereby enabling the hunter or naturalist to position himself at or near the top of the canopy, for optimum concealment and visualization.

Alternatively, when ground cover or brush is high, a hunter or naturalist may opt for a ladder stand to position himself slightly above the ground cover for maximum concealment and optimal visibility. Art is replete with numerous climbing and elevated support devices for elevating the position of the hunter or the naturalist in the field. For example, some of the known devices include tree stands, which encompass two general varieties, climbing and non-climbing, both of which suspend the hunter or naturalist at a desired height, and secure solely to a tree; climbing tree stands include all stands that do not require any form of ladder while non-climbing includes all forms that require some form of ladder to enter the stand. Non-climbing stands commonly include lock on stands with ladder sticks that attach directly to the tree, ladder stands, which elevate the hunter or naturalist to a maximum height relative to the length of the ladder both of, which require the assistance of a tree for support and securement; and tripods, which do not require the assistance of a tree for support, yet which elevate the hunter or naturalist relative to the ground.

Various additional designs for tree stands are described in U.S. Pat. Nos. 4,995,475 to R. Berkbuegler and 4,997,063 to R. Bradley. Each of these patents demonstrates a pair of pivoting support arms having adjustable lengths. In each patent, a rotatable sleeve serving as a turnbuckle is provided in order to selectively shorten or lengthen the respective arms. Each of these designs employs a ridged bracket rather than a flexible cable around the tree. In addition, each of these designs requires that adjustments to the arms be made substantially simultaneously in order to prevent the tree stand from becoming unlevel or "out of horizontal."

Another prior art reference, namely U.S. Pat. No. 5,090,506 to Womack teaches a pair of threaded rods captured between corresponding opposed threaded lugs on each side of stand. Each rod has a threaded nut disposed thereon. Rotation of each threaded rod by a knob thereon results in an adjustment of the position of tree engaging blades. In this way, different tree diameters are accommodated. The device taught by the U.S. Pat. No. 5,090,506 to Womack thus requires adjustment of a threaded rod on each side of the stand in order to adjust the positioning and level of the stand uniformly.

Still another prior art reference, namely United States Patent Application Publication No. 20060169538 to Louk, U.S. Pat. Nos. 7,021,423 to Pestrue et al. and 8,230,972 to Johnson teach numerous other tree stand devices. Unfortunately, all of the aforementioned prior art references fail to provide a tree stand that will enable the hunter or naturalist to easily, comfortably and quietly change from a seated position to a standing position, or vice-versa, while also providing an adjustable implement rest for an accessory such as a gun, bow, telescope, or the like. In addition, the aforementioned prior art references also fail to provide a tree stand that is fully adjustable to accommodate any angle or length the hunter would need for just the right shot and offer additional support and safety in the archery position. Moreover, these prior art forms reference stands with shoot rails which are not adjustable to accommodate different shooting or viewing situations.

There is an opportunity for an improved tree stand assembly to enable the hunter or naturalist to easily, comfortably and quietly change from a seated position to a standing position, or vice-versa, while also providing an adjustable implement rest for an accessory such as a gun, bow, telescope while being fully adjustable to accommodate any angle or length the hunter or naturalist would need for just the right shot or view while offering additional support and safety in the standing position for either archery or general viewing.

SUMMARY OF THE INVENTION

An apparatus of this invention presents an adjustable tree stand assembly, which is connected to a surface, such as a tree, and is movable relative to the tree in various directions. The adjustable tree assembly includes a first device adaptable to be connected to the tree and presenting at least first and second members with of the first member engaging the tree and the second member extending from the first member in cantilevered fashion and pivotable connected to the first member defining various angles between the first member and the second member. The second member is movable relative the tree in various directions as well.

Alluding to the above, the first member is further defined by a tube having a rectangular cross section with a pair of teethed elements for entering into the tree and securing the first member to the tree. The second member is further defined by a second tube pivotable connected to the first tube. The pair of first elements and the pair of extension members are secured to one another by first locking devices. The guard portion is secured to the pair of extension members by second locking devices.

An adjusting device interconnects the first and second members and presents a pair of male elements, i.e. screws joined by a female element rotatable in different directions thereby joining the male elements and adjusting the male elements thereby defining various angles between the first member and the second member to position the second member in a plane desired by the user and regardless of inclination angles of the tree.

A platform is connected to the second member for supporting the user. The platform presents a base having a rear end and a front end and a peripheral edge and a bracket extending from the rear end presenting at least one of female and male connectors to mechanically engage the male and female connectors of a seat receiving portion. A pair of rods interconnect the bracket with the peripheral edge to provide structural integrity to the platform and a foot holding frame connected to the peripheral edge of the platform.

A seat device is connected to the second member and presents a back portion and a seating portion and a pair of sides connected to the back portion and said seat portion. The seat device includes the seat receiving portion that presents a tubular configuration connected to the second member and presents at least one of male and female connectors. The seat device includes a pin or a leg extending from a seating portion and a lock element connected to the pin in order to secure the seat device in a locking position relative the seat receiving portion. A rail device presents a pair of first elements secured to the sides of the seat device and a pair of extension members presenting distal ends and disposed inside respective first elements and movable to and from the first elements.

A guard portion is pivotably connected to the distal ends thereby extending between at least a first position as the first elements, the extension members and the guard portion define a single line and a second position as the guard portion is pivoted relative the distal ends and below the extension members thereby preventing fall of the user as the user stands on the platform and a third position as the guard portion is pivoted relative the distal ends and above the extension members thereby providing a support surface for the user to aim at a target. A pair of straps of the first member are used for fixedly and rigidly attaching the first element carrying the seat device and the platform to the tree.

An advantage of the present invention is to provide an improved tree stand that will enable the hunter or naturalist to easily, comfortably and quietly change from a seated position to a standing position, or vice-versa, while also providing an adjustable implement rest for an accessory such as a gun, bow, telescope, or the like.

Another advantage of the present invention is to provide an adjustable tree stand that allows the hunter to easily attach a lock-on stand to a tree and yet have a selected viewing and shooting area of 360 degrees less the diameter of the tree to which it is attached.

Still another advantage of the present invention is to provide the deer stand wherein all components are adjustable while in the stand.

Still another advantage of the present invention is to provide an innovative pivot telescopic shooting rail that meets the needs of rifle, pistol and archery hunters.

Still another advantage of the present invention is to provide an improved tree stand with a leveling system which allows it to be placed on any tree within the selected hunting area, regardless of the tree angle, allowing the hunter to be level and comfortable.

Still another advantage of the present invention is to provide an improved tree stand packaged in three (3) components and only requires one (1) locking pin to be fully assembled unlike most prior art tree stands that have numerous parts and require a significant amount of time, knowledge and tools to assemble.

Still another advantage of the present invention is to provide an improved tree stand that can be transported either by pack or ATV to assemble at the hunting location.

Still another advantage of the present invention is to provide an improved tree stand that can be placed in the tree easily by one (1) person with an appropriate safety harness, while most other tree stands require at least two (2) people to safely place in a tree.

Still another advantage of the present invention is to provide an improved tree stand with full seating system as compared to other stands that have a sling seat and back that are very uncomfortable for long sitting periods.

Still another advantage of the present invention is to provide an improved tree stand presenting a pivot telescopic shooting rail detachable and fully adjustable to accommodate any angle or length the hunter would need for just the right shot. In the archery position, it offers additional support and safety not available in any other stand. Other stands that have shoot rails are not adjustable to accommodate different shooting situations and most are not easily removable.

Still another advantage of the present invention is to provide an improved tree stand that allows the hunter or naturalist to place the stand on almost any tree regardless of the angle and still be level in the seated position contrary to prior art tree stands that need to be placed on straight trees, thus limiting the hunting or visualization area to less than optimal at times.

Still another advantage of the present invention is to provide an improved tree stand that is easily locked to the tree offering additional support and theft prevention.

Still another advantage of the present invention is to provide an improved tree stand which is safe to use.

It is an object of the invention to provide improved elements and arrangements thereof in said tree stand for the purposes described which is inexpensive, dependable and fully effective in accomplishing its intended purposes.

These and other objects of the present invention will become readily apparent upon further review of the following specification and drawings.

Other objects, features, and advantages of the present invention will become apparent upon consideration of the following detailed description of a preferred embodiment thereof, when taken in conjunction with the appended drawing.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE INVENTION

Figure 1:
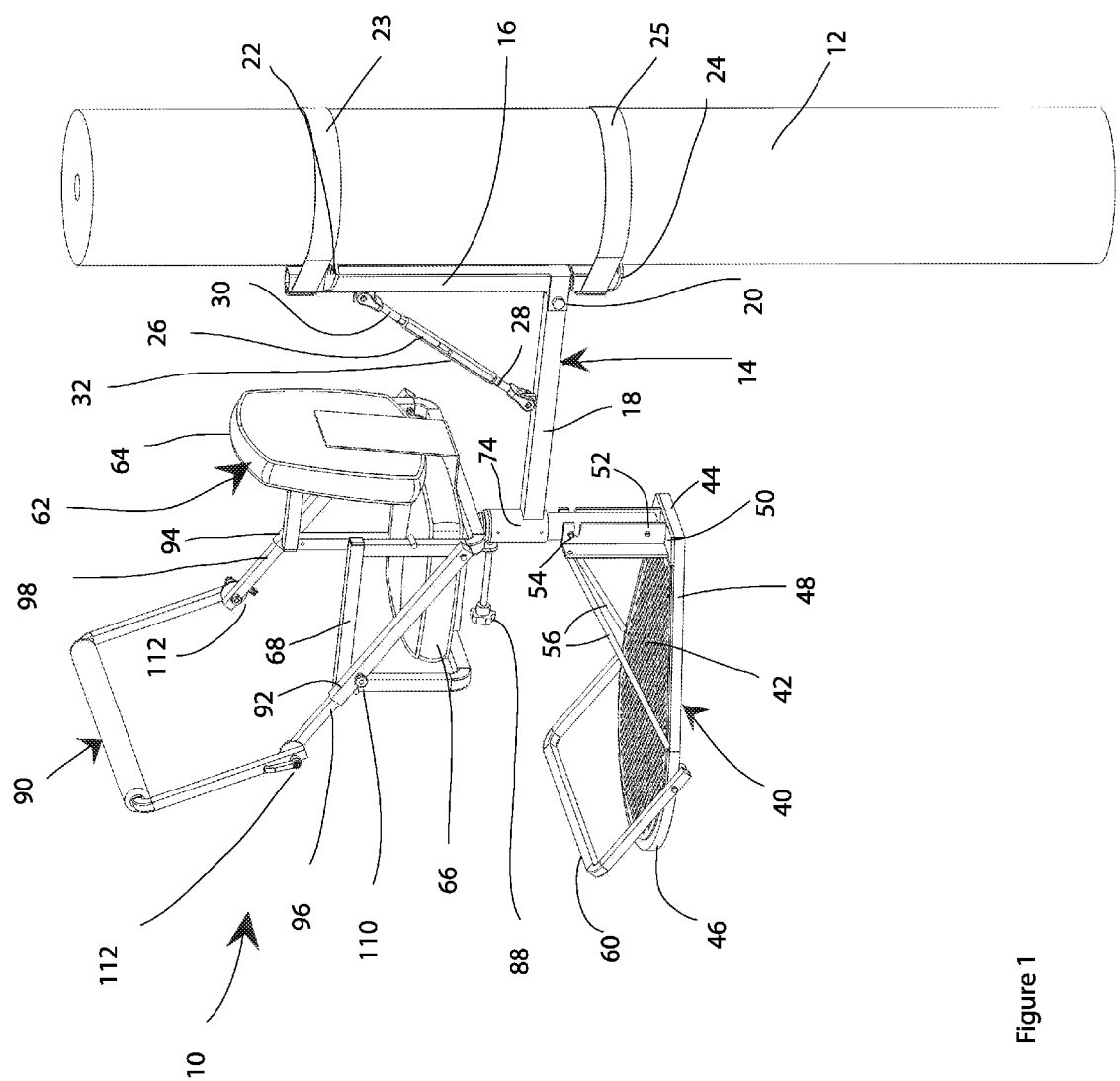
FIG. 1 illustrates a general view of a tree stand of the present invention completely assembled and attached to a surface such as for example, a tree.
Figure 2:
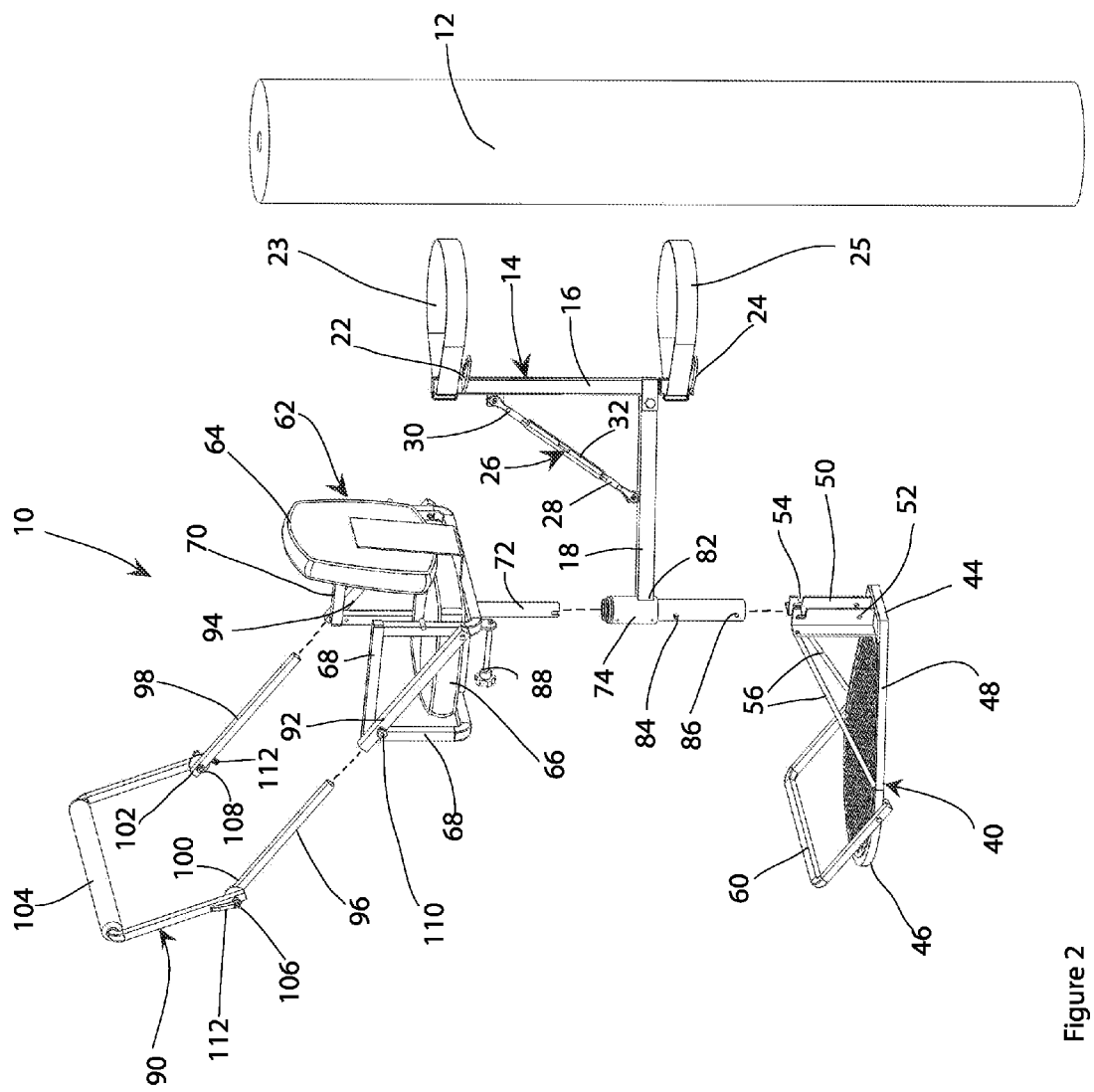
FIG. 2 illustrates an exploded view of the tree stand as illustrated in FIG. 1 wherein all components included and not limited to an adjustable shooting rail, a seat, a seat frame, a leveling unit, and a rotary bearing and platform are shown.

Referring to FIGS. 1 through 8, wherein like numerals indicate like or corresponding parts throughout the several views, an apparatus of the present invention such as an adjustable tree stand assembly, is generally shown at 10. The adjustable tree stand assembly 10 is connected to a surface, such as a tree 12 and is movable relative to the tree 12 in various directions, as best shown in FIGS. 3, 4, and 6 through 8.

The adjustable tree stand assembly 10 includes a first device, generally indicated at 14, adaptable to be connected to the tree 12 and presenting at least first and second members 16 and 18. The first member 16 is used for engaging the tree 12 and the second member 18 extends from the first member 16 in cantilevered fashion and pivotable connected, as shown at 20, to the first member 16 defining various angles between the first member 16 and the second member 18. The second member 18 is movable relative the tree 12 in various directions.

Figure 9:
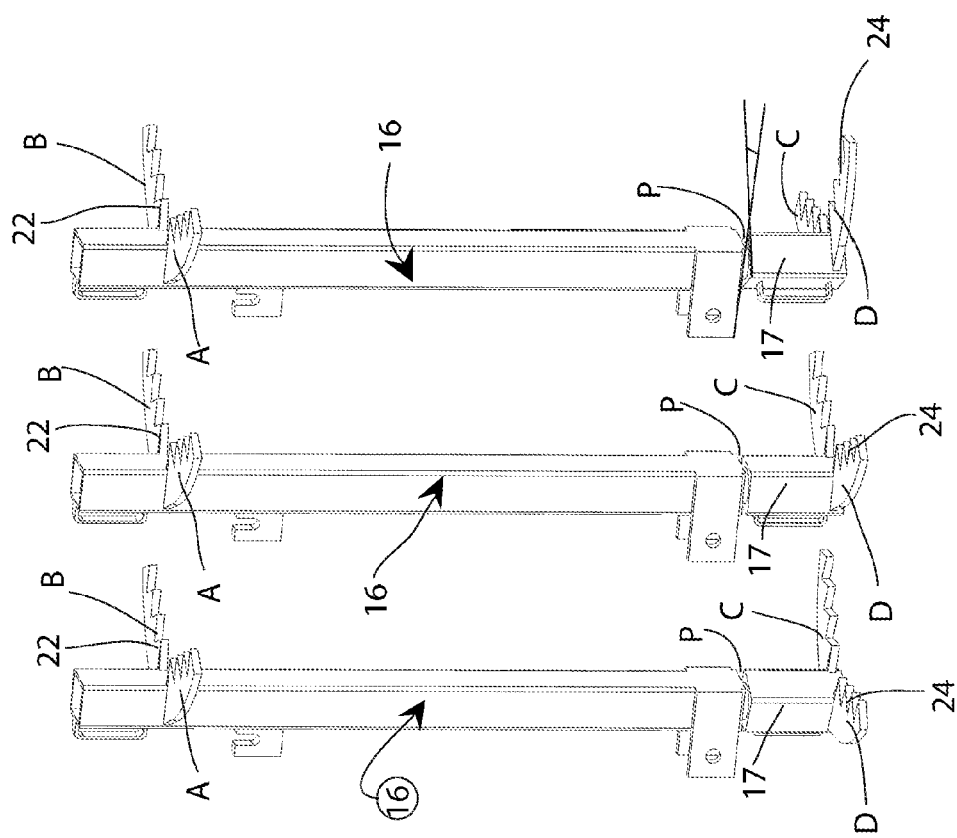
FIG. 9 illustrates several positions of a first member defined by a tube having a rectangular cross section with a pair of teethed elements pivotable about the first member for better engaging with the tree to form a rigid contact at four points or positions and a lower section engaging one of the teethed elements and rotatable relative the first member to better engage the tree.

The first member 16 is further defined by a tube having a rectangular cross section with a pair of teethed elements 22 and 24 pivotable about the first member 16 for better engaging with the tree 12 to form a rigid contact at four points or positions A, B, C, and D and securing the first member 16 to the tree 12. As best shown in FIG. 9, the first member 16 includes a section, generally indicated at 17, connected to one of the teethed elements 24. The section 17 presents a tubular configuration. Alternatively, it may include non-tubular configuration, a rectangular or circular cross section, without limiting the scope of the present invention. The section 17 is rotatable relative the first member 16 to position the teethed element 24 relative the other of teethed elements 22 in order to better position the first member 16 relative the tree 12 and improve rigid connection between the first device 14 and the tree 12 and between the four points or positions A, B, C, and D and the tree 12.

The pivotable connection between the first member 16 and the teethed elements 22 and 24 will allow the user U to perfectly position the first device 14 and secure the same with the tree 12. The second member 18 is further defined by a second tube pivotable connected 20 to the first tube 16. The first and second members 16 and 18 may be formed from metal and metal allows or any other rigid polymeric materials such as carbon fiber without limiting the scope of the present invention.

Figure 3:
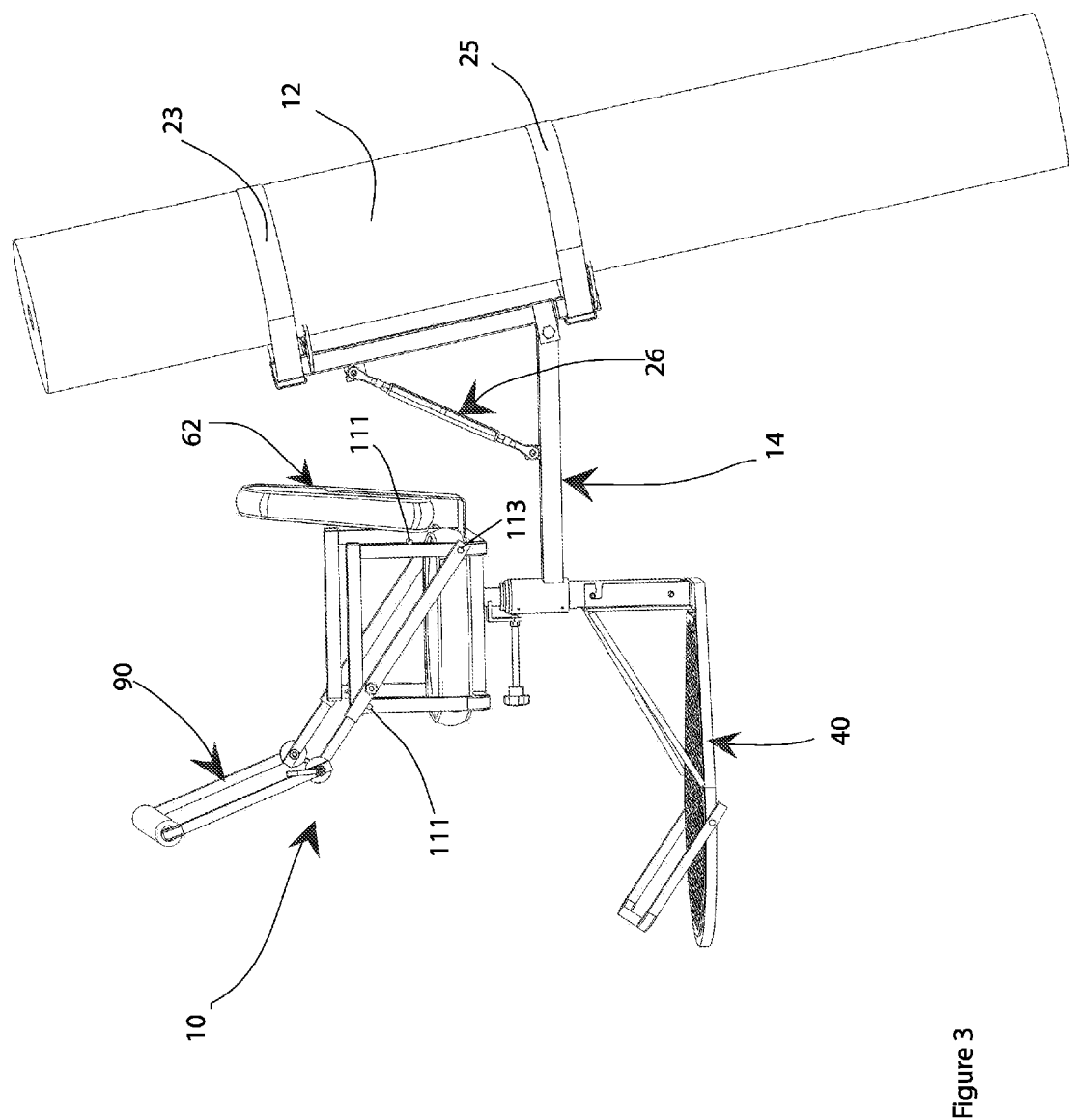
FIGS. 3 and 4 illustrate different views of a leveling system wherein the tree stand can be attached to most trees inclined in different positions and still support the hunter or naturalist in a level seated position.
Figure 4:
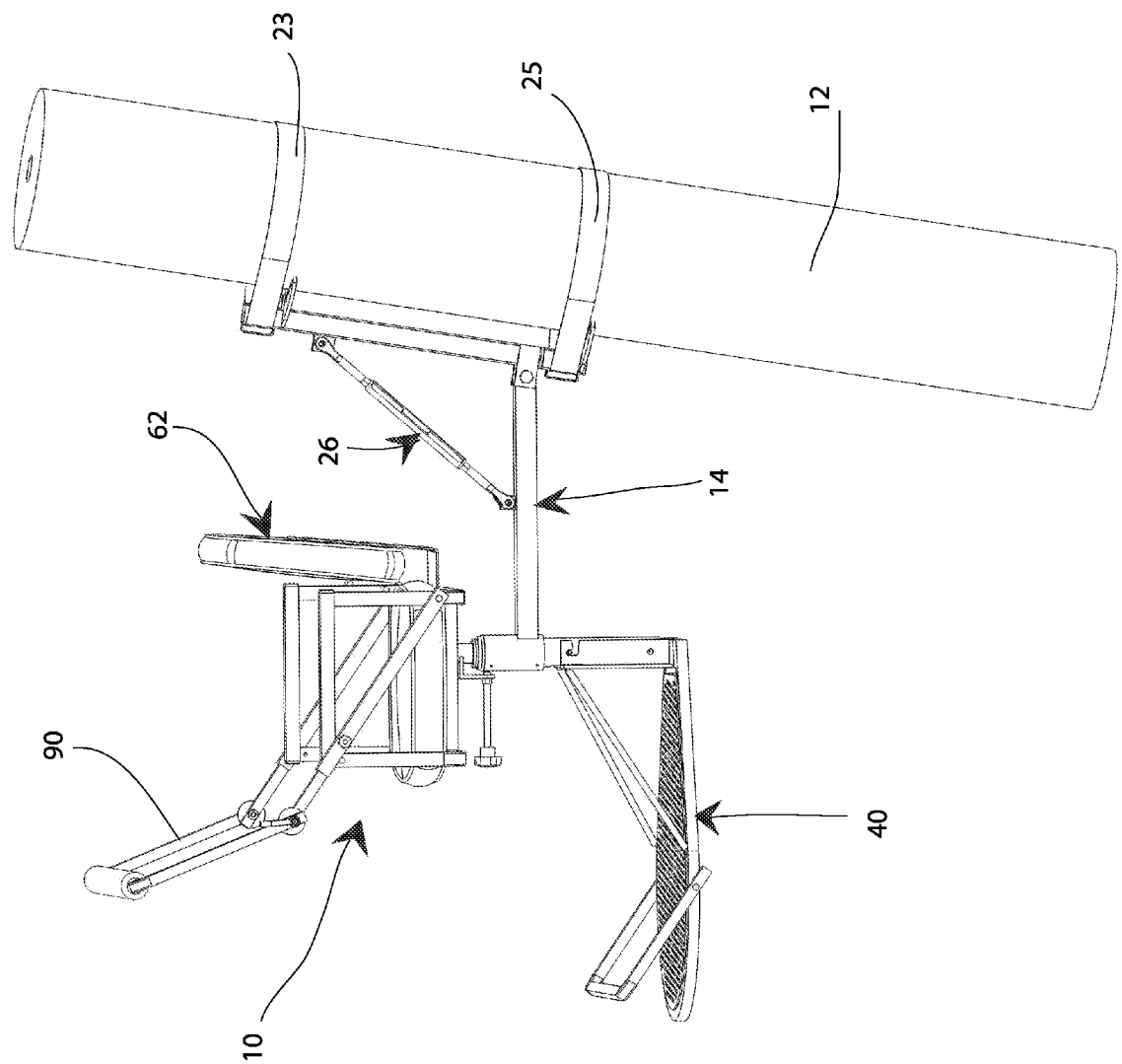

An adjusting device, generally indicated at 26, interconnects the first and second members 16 and 18. The device 26 presents a pair of male elements, i.e. screws 28 and 30 joined by a female element 32 rotatable in different directions thereby joining the male elements 28 and 30 and adjusting the male elements 28 and 30 thereby defining various angles between the first member 16 and the second member 18, as best shown in FIGS. 3 and 4, thereby positioning the second member 18 in a plane desired by the user and regardless of inclination angles of the tree 12, as best shown in FIGS. 3 and 4. The adjusting device 26 may be formed from metal and metal allows or any other rigid polymeric materials such as carbon fiber without limiting the scope of the present invention. The adjusting device 26 allows the user to change the angle between the first and second members 16 and 18 while the user sits on the tree stand.

A platform, generally indicated at 40, is connected to the second member 18 for supporting the user. The platform 40 presents a base 42 having a rear end 44 and a front end 46 and a peripheral edge 48 and a bracket 50 extending from the rear end 44 presenting at least one of female and male connectors 52 and 54 to mechanically engage male and female connectors of a seat receiving portion (to be numbered and discussed further below).

A pair of rods 56 interconnects the bracket 50 with the peripheral edge 48 to provide structural integrity to the platform 40 and a foot holding frame 60 connected to the peripheral edge 48 of the platform 40. The platform 40 may include a hatchet surface of solid surface without limiting the scope of the present invention. All components of the platform 40 may be formed from metal and metal allows or any other rigid polymeric materials such as carbon fiber without limiting the scope of the present invention.

A seat device, generally indicated at 62, is connected to the second member 18 and presents a back portion 64 and a seating portion 66 and a pair of sides 68 and 70 connected to the back portion 64 and the seating portion 66. The seating device 66 is inserted through a pin 72 extending from the seating portion 66 into a seat receiving portion 74 that presents a tubular configuration and is connected to a distal end 82 of the second member 18 that presents at least one of male and female connectors 84 and 86. The seat device 62 includes a lock element 88 connected to the pin 80 in order to secure the seat device 62 in a locking position relative a seat receiving portion 82.

All components of the seat device 62 may be formed from metal and metal allows or any other rigid polymeric materials such as carbon fiber without limiting the scope of the present invention. The components of the seat device 62 may be solid or have a tubular configuration without limiting the scope of the present invention. The components of the seat device 62 may be fabricated by casting or injection molding process without limiting the scope of the present invention.

A rail device, generally indicated at 90, presents a pair of first elements 92 and 94 secured to the sides of the seat device 62 and a pair of extension members 96 and 98 presenting distal ends 100 and 102 and disposed inside respective first elements 92 and 94 and movable to and from the first elements 92 and 94. A guard portion 104 is pivotable connected, as shown at 106 and 108, to the distal ends 100 and 102. All components of the rail device 90 may be formed from metal and metal allows or any other rigid polymeric materials such as carbon fiber without limiting the scope of the present invention. The components of the rail device 90 may be solid or have a tubular configuration without limiting the scope of the present invention. The components of the rail device 90 may be fabricated by casting or injection molding process without limiting the scope of the present invention. The pair of first elements 92 and 94 and the pair of extension members 96 and 98 are secured to one another by first locking devices 110 and the guard portion 90 is secured to the pair of extension members 96 and 98 by second locking devices 112. Type and number of locking devices 110 and 112 is not intended to limit the scope of the present invention. As best shown in FIG. 3, a pair of pins 111 are connected to and spaced from one another at the sides 68 and 70. The pins 111 are used to hold and support the pair of first elements 92 and 94 on the sides 68 and 70 and prevent the first elements 92 and 94 from moving beyond the sides 68 and 70 as the first and second elements 92 and 94 pivot about point 113. Alternatively, the pins 111 can be retractable in order to move the first and second elements 92 and 94 beyond the sides 68 and 79 as the first and second elements 92 and 94 pivot about point 113.

As best shown in FIGS. 5A through 5E, a functionality of the rail device 90 will now be discussed. The rail device 90 may extend into various positions to enable hunter or naturalist, as generally indicated at U, to easily, comfortably and quietly change from a seated position to a standing position, or vice-versa, while also providing an adjustable implement rest for an accessory such as a gun, bow, telescope, or the like.

Figure 5A:
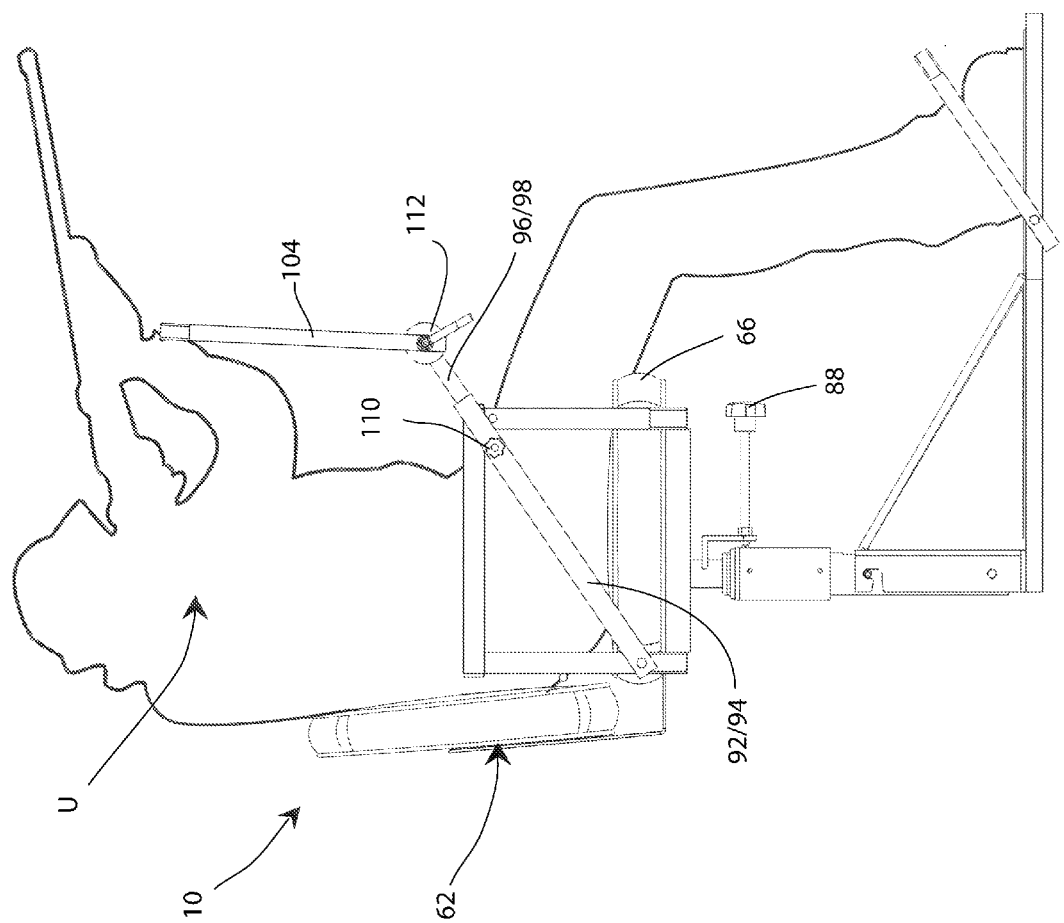
FIGS. 5A through 5E illustrate a multitude of positions of continuously adjustable, pivot telescopic shooting rail.
Figure 5B:
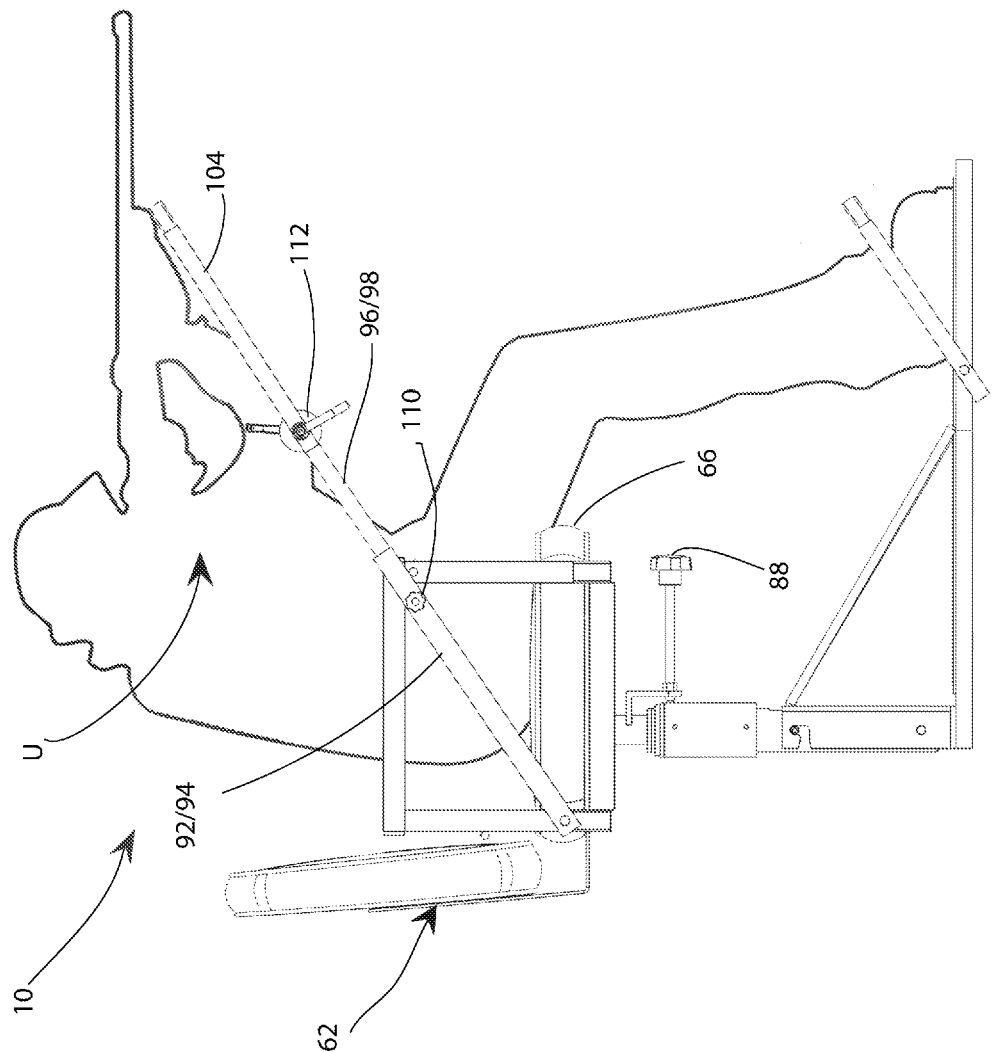
Figure 5C:
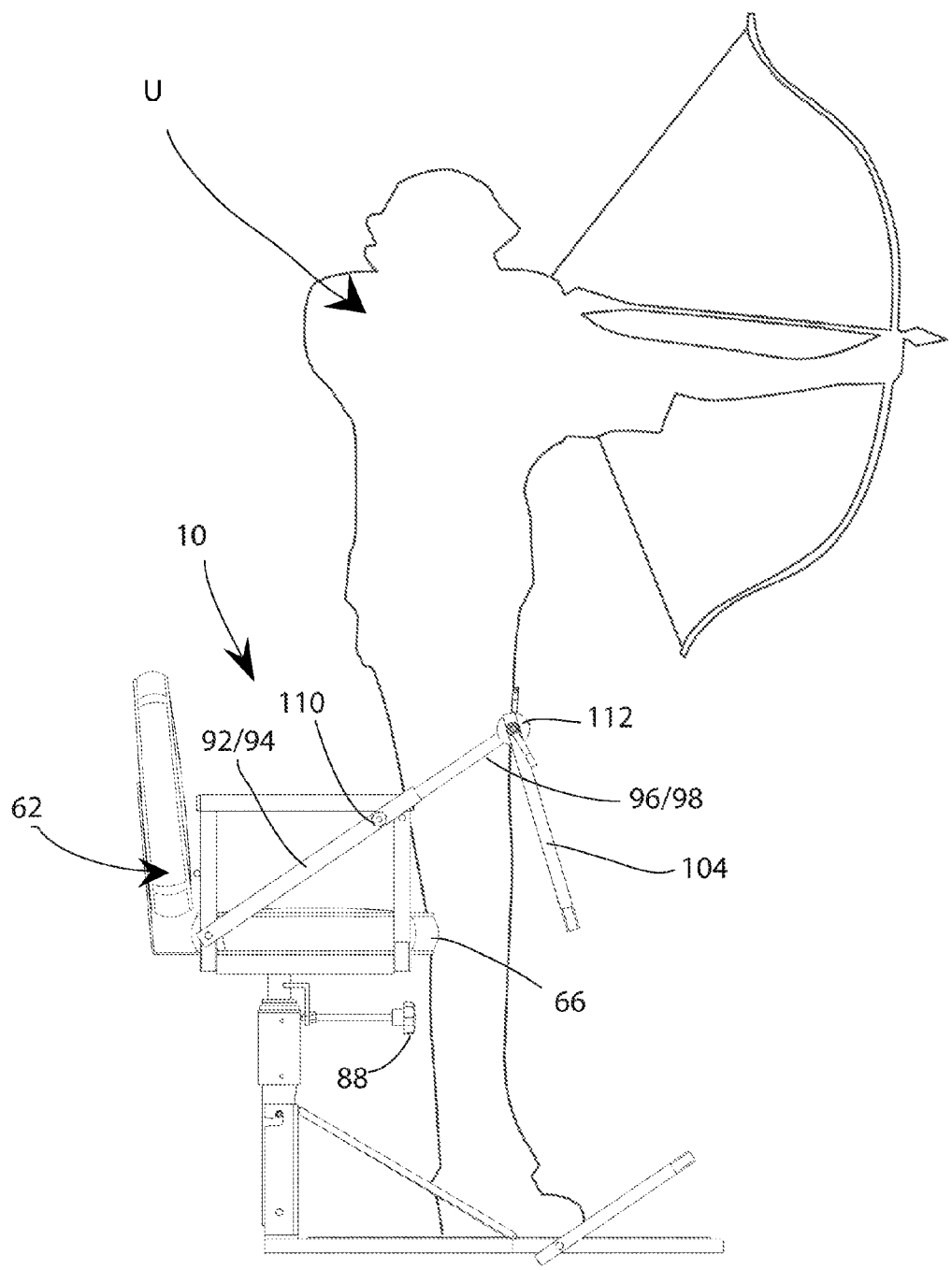
Figure 5D:
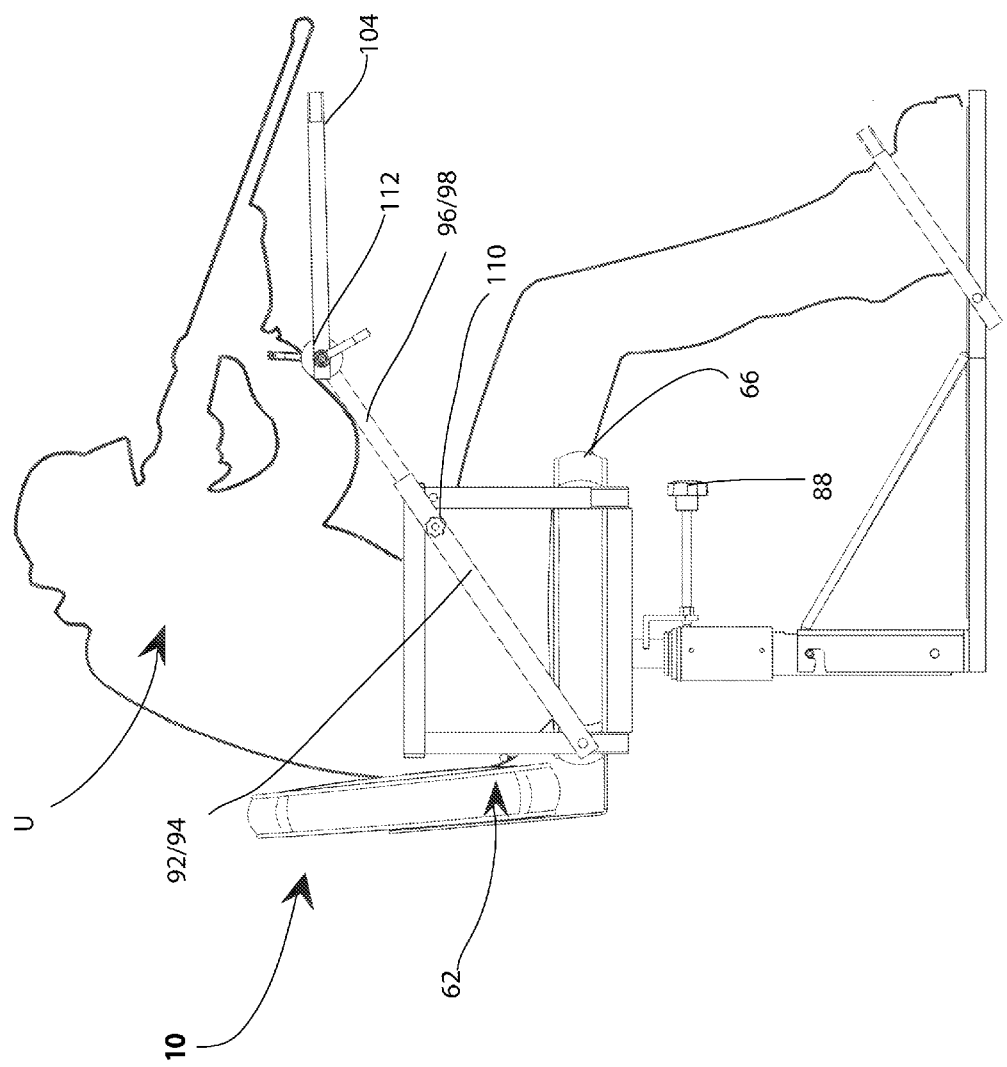

The rail device 90 extends from a first position as the first elements 92 and 94, the extension members 96 and 98 and the guard portion 104 define a single line to a second position, as shown in FIGS. 5D and 5C as the guard portion 104 is pivoted relative the distal ends of the extension members 96 and 98 and below the extension members 96 and 98 thereby preventing fall of the user U as the user U stands on the platform 40.

Figure 5E:
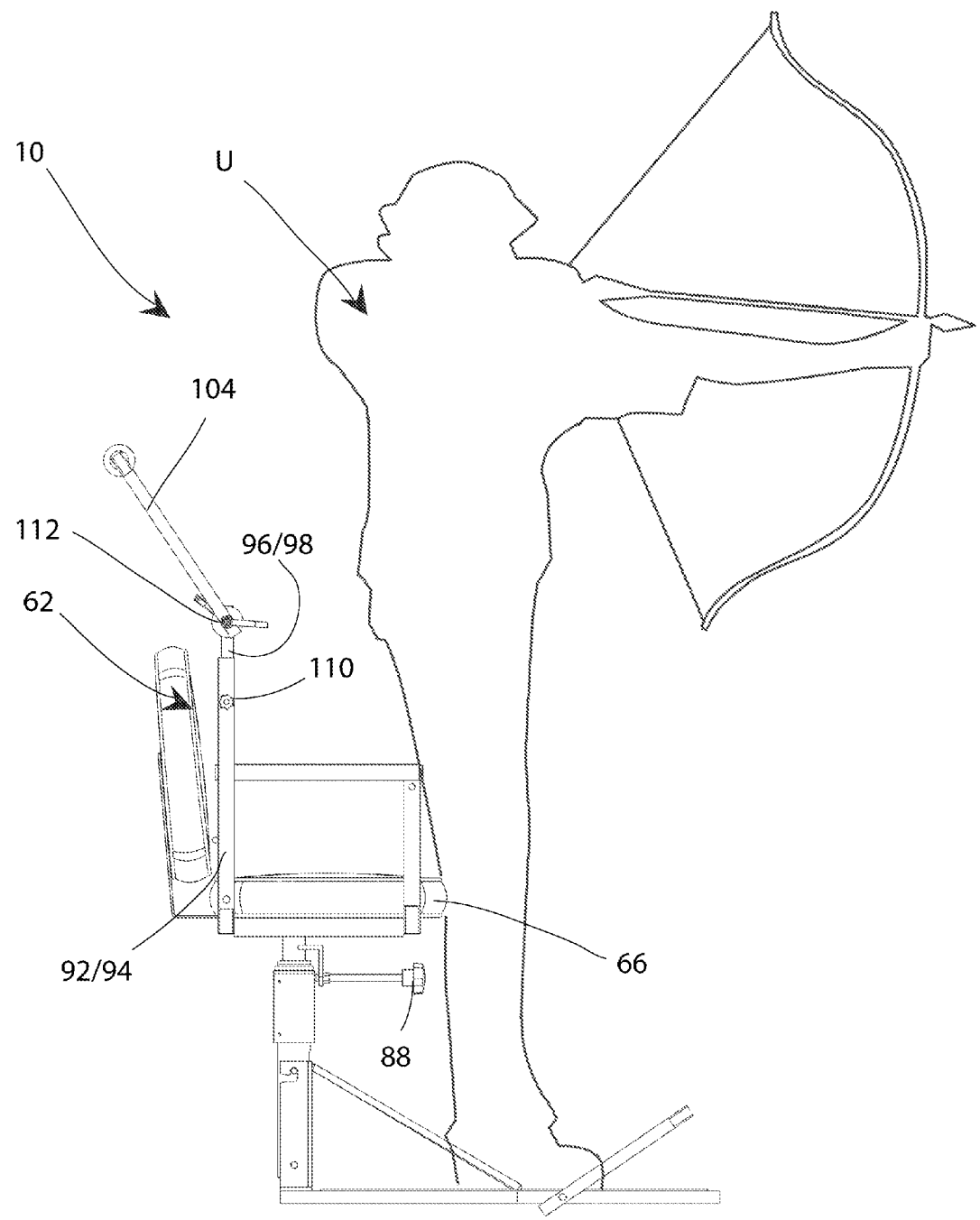
Figure 6:
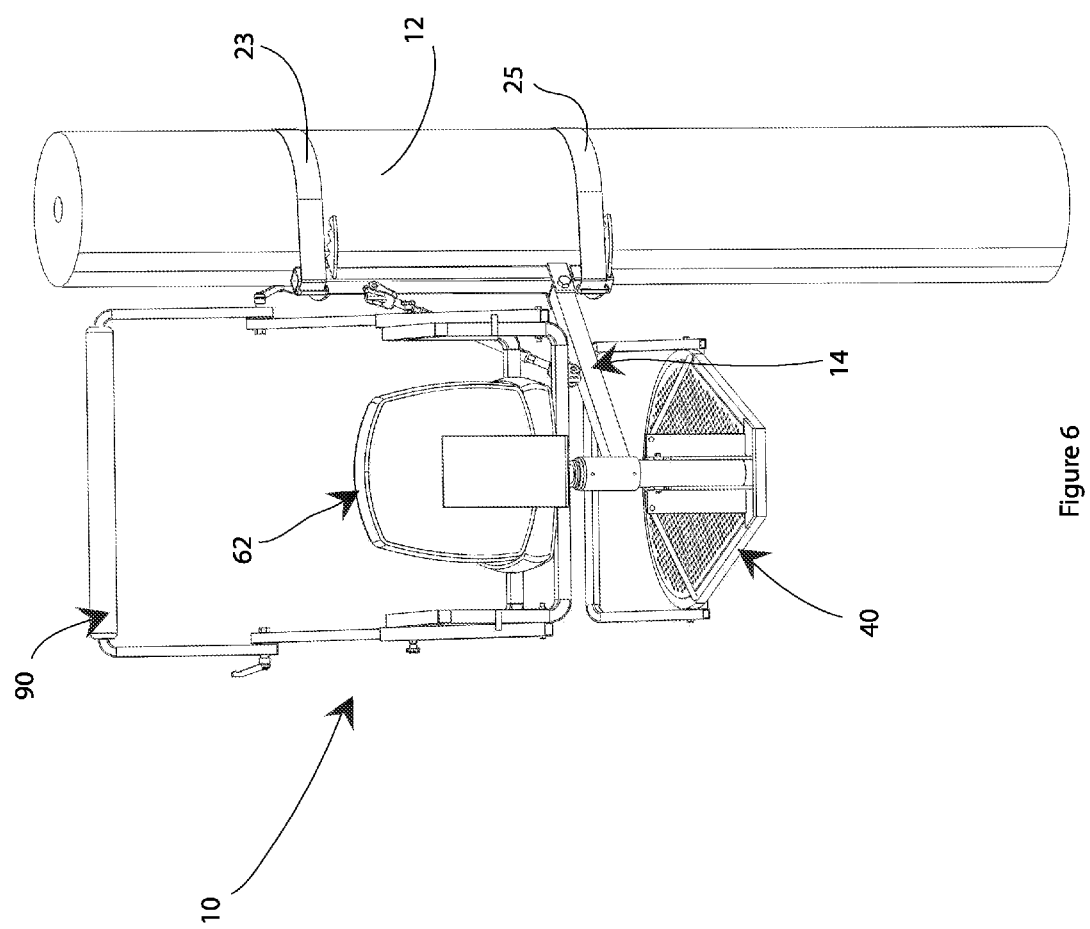
FIGS. 6 through 8 illustrate multiple positions of the tree stand and ability of the tree stand to revolve, offering the hunter or naturalist unlimited directions to face and lock the tree stand in place.
Figure 7:
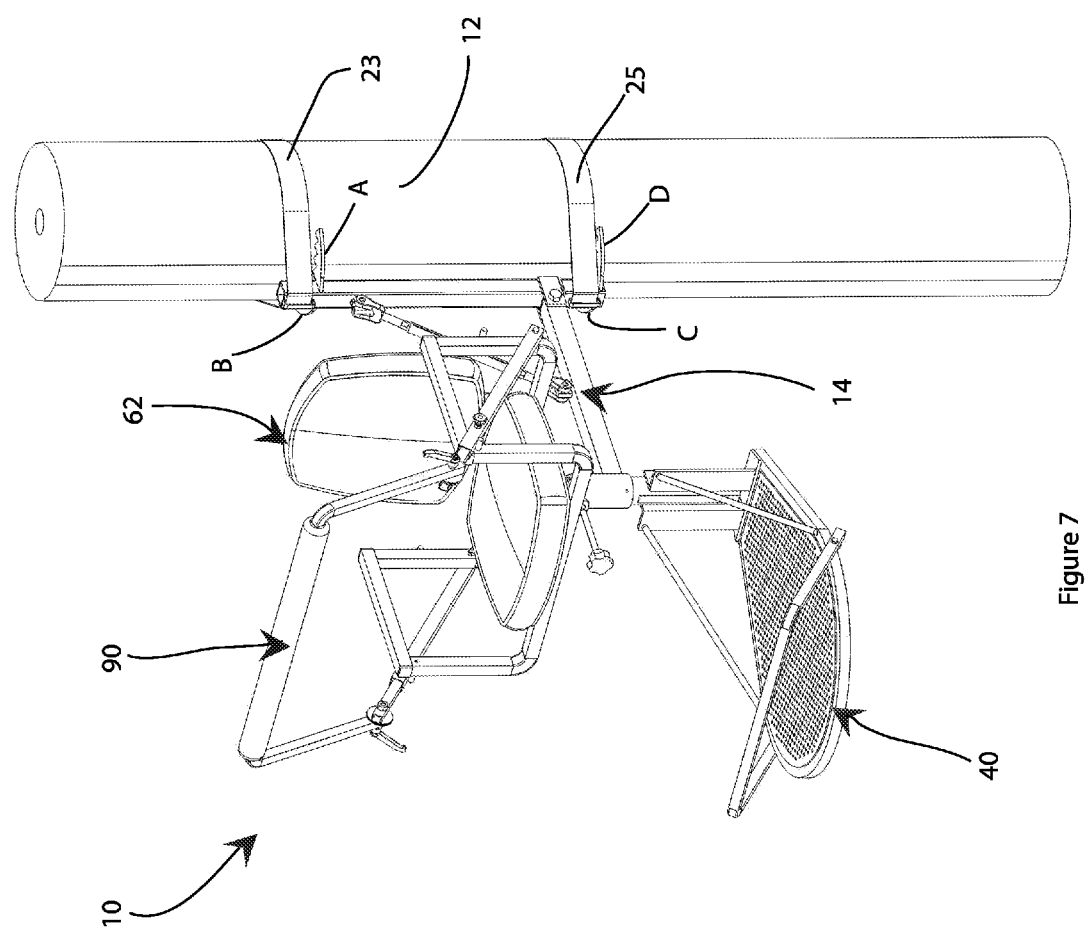
Figure 8:
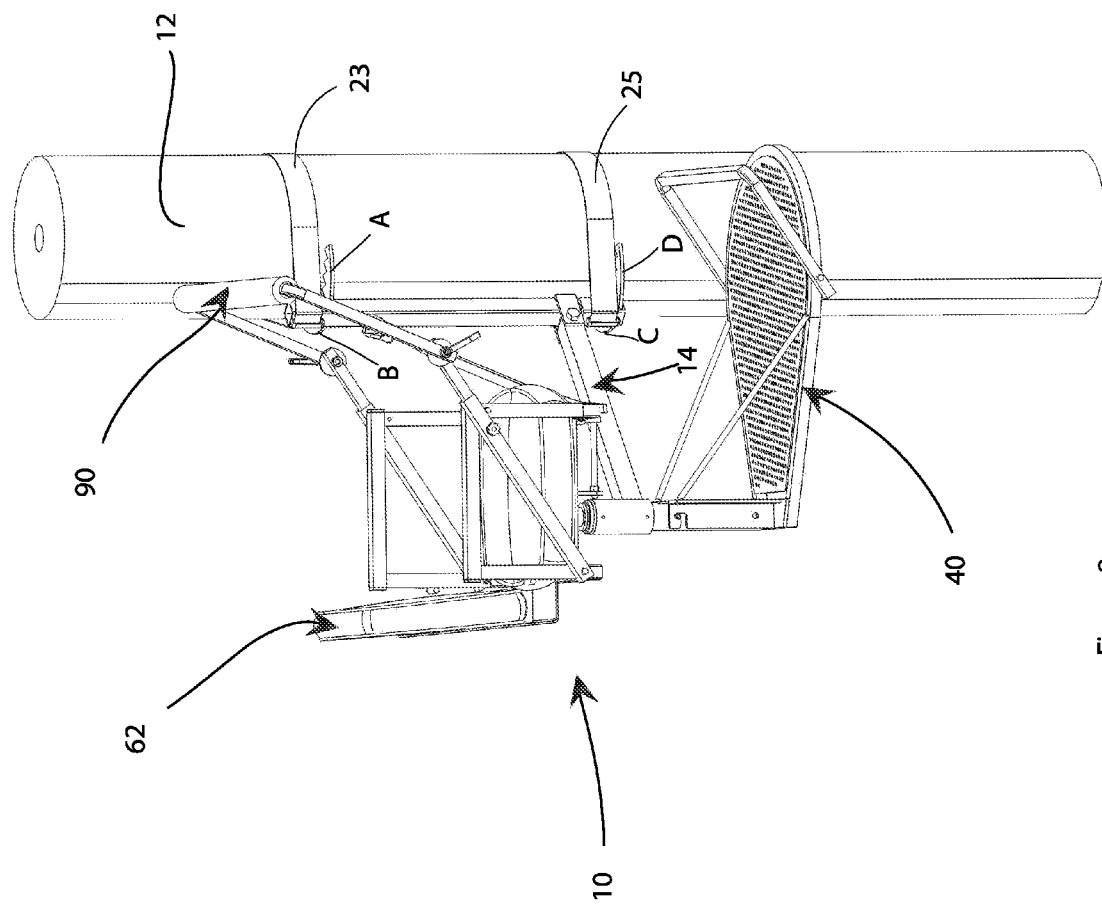

As shown in FIG. 5B, the rail device 90 further extends into a third position as the guard portion 104, which can be padded, is pivoted relative the distal ends and above the extension members 96 and 98 thereby providing a support surface for the user U to aim at the target. Based on completion and size of the user U the extension members 96 and 98 may telescopingly extend out from the first elements 92 and 94 or inside the first elements 92 and 94, as shown in FIG. 5A to accommodate hunters and users U of all eight, height, and the like. The positions of the rail device 9 and angles as shown between the guard portion 104 and the extension members 96 and 98 are not intended to limit the scope of the present invention and presented in FIGS. 5A through 5E for just several of illustrative positions. As shown in FIG. 5E, as the guard portion 104 is pivoted relative the distal ends of the extension members 96 and 98 and beyond the seat device 62 and further below the extension members 96 and 98 retracted telescopingly inside the first elements 92 and 94 thereby allowing the user U stands on the platform 40.

Alluding to the above, a pair of straps 23 and 25 may be used with the first member 16 to fixedly and rigidly attach the first member 16 carrying the seat device 62 and the platform 40 to the tree 12.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An adjustable tree stand assembly connected to a surface and movable relative to the surface in various directions, said adjustable tree assembly comprising;
   a first device adaptable to be connected to the surface and presenting at least first and second members with said first member engaging the surface and said second member extending from said first member in cantilevered fashion and pivotable connected to said first member thereby defining various angles between said first member and said second member with said second member movable relative the surface in various directions;
   a platform connected to said second member for supporting a user;
   a seat device connected to said second member and presenting a back portion and a seating portion and a pair of sides connected to said back portion and said seat portion; and
   a rail device presenting a pair of first elements secured to said sides of said seat device and pair of extension members presenting distal ends and disposed inside respective first elements and movable to and from said first elements and a guard portion pivotable connected to said distal ends thereby extending between at least a first position as said first elements, said extension members and said guard portion define a single line and a second position wherein said guard portion is pivoted relative said distal ends and below said extension members thereby preventing fall of the user as the user stands on said platform and a third position wherein said guard portion is pivoted relative said distal ends and above said extension members thereby providing a support surface for the user to aim at a target.

2. An adjustable tree stand assembly as set forth in claim 1, wherein said first member is further defined by a tube having a rectangular cross section with a pair of teethed elements for entering into the surface and securing said first member thereto.

3. An adjustable tree stand assembly as set forth in claim 2, wherein said second member is further defined by a second tube pivotable connected to said first tube and an adjusting device interconnecting said first and second members and presenting a pair of male elements joined by a female element rotatable in different directions thereby joining said male elements and adjusting said male elements thereby defining various angles between said first member and said second member to position said second member in a plane desired by the user and regardless of inclination angles of the surface.

4. An adjustable tree stand assembly as set forth in claim 3, including a seat receiving portion of a tubular configuration connected to said second member and presenting at least one of male and female connectors.

5. An adjustable tree stand assembly as set forth in claim 4, wherein said seat device includes a pin extending from said seating portion and a lock element connected to said pin in order to secure said seat device in a locking position relative said seat receiving portion.

6. An adjustable tree stand assembly as set forth in claim 5, wherein said pair of first elements, sides of said of said seat device, said pair of extension members presenting distal ends and said guard portion present a tubular configuration with a generally rectangular cross section.

7. An adjustable tree stand assembly as set forth in claim 6, wherein said pair of first elements and said pair of extension members are secured to one another by first locking devices and said guard portion is secured to said pair of extension members by second locking devices.

8. An adjustable tree stand assembly as set forth in claim 7, wherein said platform present a base having a rear end and a front end and a peripheral edge and a bracket extending from said rear end presenting at least one of female and male connectors to mechanically engage said male and female connectors of said seat receiving portion and a pair of rods interconnecting said bracket with said peripheral edge to provide structural integrity to said platform and a foot folding frame connected to said peripheral edge of said platform.

9. An adjustable tree stand assembly as set forth in claim 1, wherein said first member includes a pair of straps for fixedly and rigidly attaching said first element carrying said seat device and said platform to the surface.

10. An adjustable tree stand assembly connected to a tree and movable relative to the tree in various directions, said adjustable tree assembly comprising;
    a first device adaptable to be connected to the surface and presenting at least first and second members with said first member engaging the surface and said second member extending from said first member in cantilevered fashion and pivotable connected to said first member thereby defining various angles between said first member and said second member with said second member movable relative the surface in various directions;
    a seat device connected to said second member and presenting a back portion and a seating portion and a pair of sides connected to said back portion and said seat portion;
    a rail device presenting a pair of first elements secured to said sides of said seat device and pair of extension members presenting distal ends and disposed inside respective first elements and movable to and from said first elements and a guard portion pivotable connected to said distal ends thereby extending between at least a first position as said first elements, said extension members and said guard portion define a single line and a second position wherein said guard portion is pivoted relative said distal ends and below said extension members thereby preventing fall of the user as the user stands on said platform and a third position wherein said guard portion is pivoted relative said distal ends and above said extension members thereby providing a support surface for the user to aim at a target; and an adjusting device interconnecting said first and second members and presenting a pair of male elements joined by a female element rotatable in different directions thereby joining said male elements and adjusting said male elements defining various angles between said first member and said second member to position said second member in a plane desired by the user regardless of inclination angles of the tree to provide various seating positions to aim at the target.

11. An adjustable tree stand assembly as set forth in claim 10, wherein said first member is further defined by a tube having a rectangular cross section with a pair of teethed elements for entering into the surface and securing said first member thereto and said second member is further defined by a second tube pivotable connected to said first tube.

12. An adjustable tree stand assembly as set forth in claim 10, including a seat receiving portion of a tubular configuration connected to said second member and presenting at least one of male and female connectors.

13. An adjustable tree stand assembly as set forth in claim 10, wherein said seat device includes a pin extending from said seating portion and a lock element connected to said pin in order to secure said seat device in a locking position relative said seat receiving portion.

14. An adjustable tree stand assembly as set forth in claim 10, wherein said pair of first elements, sides of said of said seat device, said pair of extension members presenting distal ends and said guard portion present a tubular configuration with a generally rectangular cross section.

15. An adjustable tree stand assembly as set forth in claim 10, wherein said pair of first elements and said pair of extension members are secured to one another by first locking devices and said guard portion is secured to said pair of extension members by second locking devices.

16. An adjustable tree stand assembly as set forth in claim 10, wherein said platform present a base having a rear end and a front end and a peripheral edge and a bracket extending from said rear end presenting at least one of female and male connectors to mechanically engage said male and female connectors of said seat receiving portion and a pair of rods interconnecting said bracket with said peripheral edge to provide structural integrity to said platform and a foot folding frame connected to said peripheral edge of said platform.

17. An adjustable tree stand assembly as set forth in claim 10, wherein said first member includes a section connected to one of said teethed elements, said section being rotatable relative said first member to position said teethed element relative the other teethed element in order to better position said first member relative the tree and improve rigid connection between said first device and the tree.

* * * * *